US009251321B2

(12) United States Patent
Huang et al.

(10) Patent No.: US 9,251,321 B2
(45) Date of Patent: Feb. 2, 2016

(54) METHODS AND NODES FOR HANDLING USAGE POLICY

(71) Applicant: Telefonaktiebolaget L M Ericsson (publ), Stockholm (SE)

(72) Inventors: Vincent Huang, Sollentuna (SE); Yi Cheng, Sundbyberg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 14/436,163

(22) PCT Filed: Oct. 22, 2012

(86) PCT No.: PCT/SE2012/051128
§ 371 (c)(1),
(2) Date: Apr. 16, 2015

(87) PCT Pub. No.: WO2014/065720
PCT Pub. Date: May 1, 2014

(65) Prior Publication Data
US 2015/0278486 A1    Oct. 1, 2015

(51) Int. Cl.
*H04L 29/06* (2006.01)
*G06F 21/10* (2013.01)
*G06F 21/60* (2013.01)

(52) U.S. Cl.
CPC .............. *G06F 21/10* (2013.01); *G06F 21/60* (2013.01); *H04L 63/20* (2013.01); *H04L 63/10* (2013.01)

(58) Field of Classification Search
CPC .... H04L 63/20; H04L 63/10; H04L 2209/603
USPC ........................................................ 726/1, 7
See application file for complete search history.

(56) References Cited

U.S. PATENT DOCUMENTS

| 6,510,513 | B1* | 1/2003 | Danieli | G06F 21/64 380/279 |
| 7,073,073 | B1* | 7/2006 | Nonaka | G06F 21/10 380/277 |

(Continued)

FOREIGN PATENT DOCUMENTS

| CN | 1956587 | 5/2007 |
| CN | 102273248 | 12/2011 |
| CN | 102422678 | 4/2012 |

OTHER PUBLICATIONS

PCT Notification of Transmittal of the International Search Report and the Written Opinion of the International Searching Authority, or the Declaration for International application No. PCT/CN2012/086950, Sep. 26, 2013.

(Continued)

*Primary Examiner* — Samson Lemma
(74) *Attorney, Agent, or Firm* — Patent Portfolio Builders, PLLC

(57) ABSTRACT

Methods and nodes (300a, 300b, 302) for handling a usage policy (P1.P2) pertaining to source data (D1,D2) generated by a source node (300a, 300b). The usage policy dictates permission to access and use the source data. The source node calculates a signature (Sig) based on an identification (id_D) of the source data and the usage policy (P) of the source data, and provides the source data, its usage policy and the calculated signature to a data processing node (302). The data processing node then generates new data (D3) based on the source data, and calculates a new signature (Sig3) based on an identification (ldj_)3 of the new data and at least one of: a new usage policy (P3) pertaining to the generated new data, and the usage policy (P1, P2) of the source data. The data processing node finally provides the new data, the usage policies (P1, P2, P3) and the signatures (Sig1, Sig2, Sig3) to a data receiving node (304) which is thereby enabled to verify and comply with the provided usage policies based on the respective associated signatures.

18 Claims, 5 Drawing Sheets

(56) References Cited

U.S. PATENT DOCUMENTS

| | | | |
|---|---|---|---|
| 7,761,465 B1* | 7/2010 | Nonaka | G06F 21/10 707/770 |
| 8,768,567 B2* | 7/2014 | Diab | G11B 20/00086 380/201 |
| 2012/0255026 A1* | 10/2012 | Baca | G06F 21/10 726/26 |
| 2013/0247142 A1* | 9/2013 | Nishizawa | G06F 21/604 726/1 |
| 2015/0207820 A1* | 7/2015 | Klug | H04L 63/20 726/1 |

OTHER PUBLICATIONS

"Sticky Policies: An Approach for Managing Privacy across Multiple Parties" by Pearson et al., 2011.

"End-to-End Policy-Based Encryption and Management of Data in the Cloud" by Pearson et al.; 2011 Third IEEE International Conference on Cloud Computing Technology and Science.

"Secure Data Aggregation in Wireless Sensor Networks" by Kumar et al., Aug. 2012.

"Towards Data-Centric Security in Ubiquitous Computing Environments" by Ransom et al.; 20th International Workshop on Database and Expert Systems Application, 2009.

"Usage Management in Cloud Computing" by Jamkhedkar et al.; 2011 IEEE 4th International Conference on Cloud Computing.

Verifiable and Revocable Expression of Consent to Processing of Aggregated Personal Data by Pohls; University of Passau, Passau, Germany, 2008.

"DRM Rights Expression Language," Open Mobile Alliance, OMA-TS-DRM-REL-V2_2-20110419-C, Candidate Version 2.2, Apr. 19, 2011, pp. 1-75.

* cited by examiner

METHODS AND NODES FOR HANDLING USAGE POLICY

PRIORITY

This nonprovisional application is a U.S. National Stage Filing under 35 U.S.C. §371 of International Patent Application Serial No. PCT/SE2012/051128, filed Oct. 22, 2012 and entitled "Methods and Nodes for Handling Usage Policy."

TECHNICAL FIELD

The present disclosure relates generally to, a data processing node and method therein, and a source node and method therein, for handling a usage policy pertaining to source data generated by the source node. The usage policy dictates permission to access and use the source data.

BACKGROUND

In the field of telecommunication, data distribution networks with various data generating sensors and devices are sometimes employed to distribute often huge amounts of data in order to provide knowledge about different locations and environments to parties needing or wanting such sensor generated information. In this context, the term "sensors" is often used to denote any entities capable of registering or measuring some measurable metric or quantity and of communicating the results, e.g. at regular intervals or upon receiving a request or some trigger information, by sending source data through the network. The source data may for example refer to some physical measure such as temperature or pressure for surveillance of an object or a space, or to some counted metric such as the number of passing cars or the like. This source data can then be processed by data processing nodes having received the source data, to produce new data derived from the source data, e.g. by performing various calculations and compilations. An illustrative example may be to receive multiple temperature measurements at regular intervals from one or more sensors and then calculating an average temperature for a certain period which is then delivered to a surveillance centre.

However, the providers of source data may in some cases want to restrict access and usage of their source data which may contain sensitive or secret information, e.g. personal information which only a limited set of parties are allowed to access. It is in that case possible to apply a policy for the data which dictates what party or node is permitted to access the source data and possibly also how the source data is permitted to be used. Naturally, more than one party or node may be permitted to access the source data. This type of policy will be referred to as "usage policy" in this description. A usage policy may comprise a set of rules which determine various restrictions and/or permissions for accessing and using the protected data.

In the following description, the term "source node" will be used to represent any sensors, counters and other entities capable of generating and communicating source data. FIG. 1 illustrates how data can be propagated through a data distribution network where source nodes denoted "SN" generate and send source data which is received by data processing nodes 102, 104. In this example, a first data processing node 102 receives source data D from three source nodes 100a. The data processing node 102 then processes the received source data in order to produce some new data D' which is thus derived from the received source data D. The data processing node 102 sends the new data D' to another data processing node 104 which performs more processing of the received data D' and possibly also of source data D received from other source nodes 100b, as indicated by dashed lines in the figure.

In this way, the second data processing node 104 generates further new data D" which is thus derived from both source data D and previously processed data D'. In this example, the second data processing node 104 delivers the resulting data D" to a "data receiving node" 106 denoted "RN". The nodes 102, 104 and 106 can thus be seen as direct or indirect users of the original source data D. It should be noted that both data processing nodes 102, 104 can also be regarded as data receiving nodes in this context which term is used to simply indicate that the nodes receive data from one or more preceding nodes. It can be understood that the above-illustrated distribution of data originating from various source nodes may be cascaded in any number of steps which could involve any number of nodes.

When the providers of source data want to control and restrict access to their source data by means of a usage policy, it is possible today to control enforcement of that policy in the first distribution step, i.e. for any processing or receiving node in direct communication with the source node. In the shown example of FIG. 1, the three source nodes 100a send their source data to the first data processing node 102 and are therefore able to apply and enforce their usage policies on the latter node 102, e.g. by using shared keys or the like needed to "open" the source data. For example, it is possible to employ an authentication procedure between two interconnected nodes to enforce a usage policy that regulates whether data sent from one of the nodes to the other can be accessed or not. However, a usage policy is normally bound to a specific piece of data with a given identity and once new data is derived from the source data at the receiving/processing node, it becomes a new piece of information with a new identity for which the original policy is no longer valid.

In the next distribution step of FIG. 1, the first data processing node 102 may apply and enforce its own usage policy on the newly generated data D' when delivered to the second data processing node 104, but any usage policies of the original source data D will be lost in this step unless manually copied into the new policy of the new data D'. Further, the second data processing node 104 may likewise apply its own policy on the further processed data D" when distributing it to other processing and/or data receiving nodes, potentially unknown to the providers of the source data.

As a result, it is a problem that providers of source data have no way of controlling how their source data is used and by what parties or nodes beyond the first distribution step. The sender of source data or processed data has thus no way of knowing if a policy of that data is enforced and followed at all subsequent receivers of the data and/or of any new data derived therefrom. Further, if a usage policy of the source data is copied at each distribution step, it is not possible for subsequent receivers to verify the origin of that usage policy and make sure that it has not been faked or manipulated along the way. Yet another problem is that it is not possible to enforce and verify different policies for different sets, or versions, of processed data originating at least partly from the same source data, e.g. when processed at different points by different processing nodes.

SUMMARY

It is an object of embodiments described herein to address at least some of the problems and issues outlined above. For example, it is an object to enable verification and enforcement of a usage policy valid for source data also after the source data has been processed to generate new data derived therefrom. It is possible to achieve these objects and others by using a method and a data processing node as defined in the attached independent claims.

According to one aspect, a method is performed by a data processing node for handling a usage policy pertaining to source data generated by at least one source node. The usage policy dictates permission to access and use the source data, which may be defined by a set of rules or the like in the usage policy. In this method, the data processing node receives the source data and usage policy together with an associated source signature from the at least one source node. The received source signature has been calculated based on an identification of the source data and at least the usage policy of the source data.

The data processing node then generates new data based on the received source data while complying with the usage policy of the source data. The data processing node also calculates a new signature based on an identification of the new data and at least one of: the usage policy of the source data, and a new usage policy which pertains to the generated new data and covers the usage policy of the source data.

The data processing node further provides the new data and the usage policies and signatures to a data receiving node. Thereby, the data receiving node is enabled to verify and comply with the provided usage policies based on respective associated signatures. It is thus an advantage that the usage policies, including the usage policy of the source data, can be verified as being valid and trustworthy, and any faked or manipulated usage policy not originating from the at least one source node will not be verified when this solution is used. If the source data is distributed and processed in multiple steps where new data is generated from the source data, the usage policy of the original source data will accompany the new data and can thus be enforced and verified accordingly by subsequent nodes in any number of steps in a data distribution path. The usage policy of the original source data can thus be considered valid and trustworthy by the subsequent nodes when verified.

According to another aspect, a data processing node is configured to handle a usage policy pertaining to source data generated by at least one source node, where the usage policy dictates permission to access and use the source data. The data processing node comprises a receiving unit adapted to receive the source data and usage policy together with an associated source signature from the source node. The source signature has been calculated based on an identification of the source data and at least the usage policy of the source data.

The data processing node further comprises a data processing unit adapted to generate new data based on the received source data, while complying with the usage policy of the source data. The data processing node also comprises a logic unit adapted to calculate a new signature based on an identification of the new data and at least one of: a new usage policy pertaining to the generated new data and the usage policy of the source data, and a providing unit adapted to provide the new data and the usage policies and signatures to a data receiving node. Thereby, the data receiving node is enabled to verify and comply with the provided usage policies based on respective associated signatures.

According to yet another aspect, a method is performed by a source node for handling a usage policy pertaining to source data generated by the source node, where the usage policy dictates permission to access and use the source data. In this method, the source node calculates a signature based on an identification of the source data and the usage policy of the source data. The source node then provides the source data and the usage policy of the source data and the calculated signature to a data processing node. Thereby, the data processing node is enabled to verify and comply with the usage policy of the source data based on the signature.

According to yet another aspect, a source node is configured to handle a usage policy pertaining to source data generated by the source node, the usage policy dictating permission to access and use the source data. The source node comprises a logic unit adapted to calculate a signature based on an identification of the source data and the usage policy of the source data, and a providing unit adapted to provide the source data and the usage policy of the source data and the calculated signature to a data processing node. Thereby, the data processing node is enabled to verify and comply with the usage policy of the source data based on the signature.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
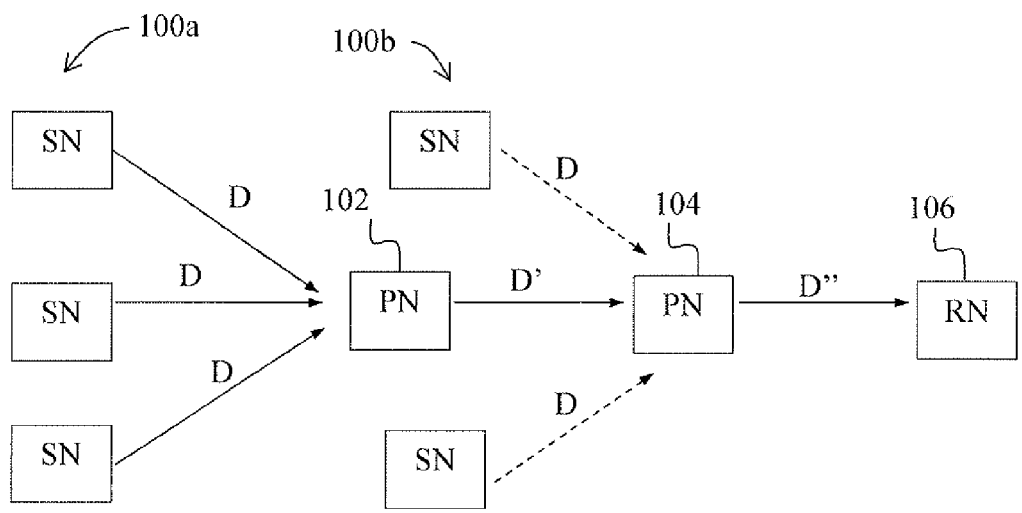
FIG. 1 is a communication scenario illustrating distribution and processing of data in a data distribution network, according to the prior art.

Briefly described, a solution is provided in a data processing node to enable efficient and reliable use of a usage policy pertaining to source data when distributed from a source node over subsequent nodes which generate and distribute new data that is derived from the source data. A source signature associated with the source data, has been calculated at the source node based on an identification of the source data and also based on the usage policy of the source data, and the data processing node receives this source signature from the source node together with the source data and the usage policy of the source data. It should be understood in this disclosure that "a source node" may refer to one or several source nodes, and that correspondingly "a usage policy" and "a signature" may refer to one or several usage policies and signatures, respectively.

Thereby, the data processing node is able to verify the received usage policy of the source data by checking whether the received source signature is correct, i.e. calculated in a correct manner based on the source data identification and the usage policy of the source data. Since the source signature is calculated based on the source data identification and the usage policy, the signature is unambiguously tied to the actual data as well as to the usage policy. For example, the identification of the source data may be an identification object that is derived from the source data e.g. using a hash algorithm. To calculate the source signature, an algorithm is used that is known by both the data processing node and the source node. To this end, a "trusted unit" or the like may be implemented in each node involved in the distribution of the data, which trusted unit is configured to handle the usage policies and signatures discussed in this disclosure in the manner described herein.

The data processing node then generates new data which is derived from the received source data, and possibly from other data e.g. generated by that data processing node or received from one or more other source or data processing nodes, and calculates a new signature which may be based on a new usage policy defined for the new data, or based on the received usage policy of the source data, or based on both policies. As mentioned above, source data, usage policies and source signatures may be received from any number of source nodes even though the terms source node, usage policy and source signature are discussed here in singular form for simplicity.

The new signature is also calculated further based on an identification of the new data to tie the new signature unambiguously to the new data. The data processing node finally provides the new data and the above source and new usage policies and source and new signatures to a data receiving node, which is able to verify and comply with the provided usage policies, including the policy of the source data, based on respective associated signatures. The data receiving node can thus verify the received source and new usage policies by checking that the received source and new signatures have been correctly calculated. The above procedure can then basically be repeated in subsequent nodes whenever new data is generated with the source data as origin and distributed to further data processing or data receiving nodes.

In this way, the usage policy of the original source data will accompany the source data and any new data derived from the source data for enforcement, and can also be verified accordingly by subsequent nodes in any number of steps in a data distribution path. The usage policy of the original source data can thus be considered valid and trustworthy by the subsequent nodes. In the same way, any usage policy pertaining to new data generated directly or indirectly from original source data can likewise be verified as being valid and trustworthy.

Figure 2:
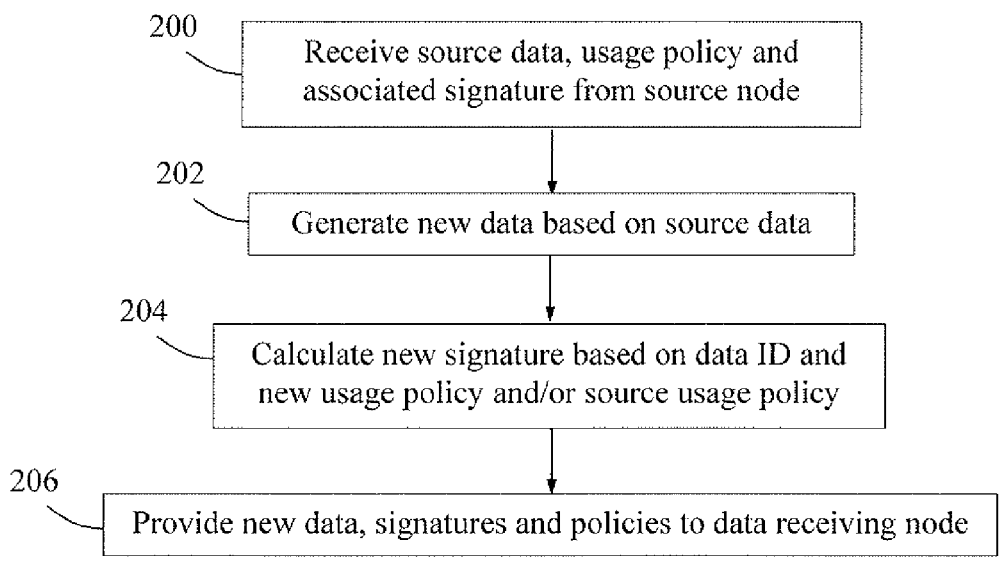
FIG. 2 is a flow chart illustrating a procedure in a data processing node, according to some possible embodiments.

An exemplary procedure executed in a data processing node of a data distribution network, for handling a usage policy pertaining to source data generated by at least one source node, will now be described with reference to the flow chart in FIG. 2. The usage policy of the source data dictates permission to access and use the source data, which policy should be followed whenever the source data and data derived therefrom is accessed and used by subsequent nodes in a distribution path of the data distribution network. This procedure can thus be used to ensure that the usage policy of the source data will be enforced and followed in multiple steps throughout the data distribution path. It is assumed that the usage polices mentioned in this description have one or more rules defining permissions and/or restrictions regarding access to and usage of the corresponding data.

A first action 200 illustrates that the data processing node receives the source data and the usage policy of the source data together with an associated source signature from the at least one source node. Receiving the source data may also include that a pointer to the data is received by which the data can be retrieved. In practice, the above information may be communicated using any of the following known protocols: hypertext transfer protocol http, Real Time Protocol RTP, File Transfer Protocol FTP, and Constrained Application Protocol CoAP, although the solution is not limited to these examples.

The received source signature has been calculated by the source node based on an identification of the source data and the usage policy of the source data. Thereby, the source signature is tied to both the source data and its usage policy, and can be used to verify both of these. It should be noted, as indicated above, that even though a usage policy and associated source signature is received from a source node in this example, this procedure is valid and useful also for cases when such a usage policy and associated source signature is received from more than one source node, i.e. basically from any number of source nodes. The source data may be protected by encryption or the like when transmitted from the source node to the processing node, which is however outside the scope of this solution and not necessary to describe here.

In a next action 202, the data processing node generates new data based on the received source data, while complying with the received usage policy of the source data. For example, the usage policy of the source data may dictate that the data processing node is allowed to access the data only in certain circumstances, or to process the data in some permitted way but not in another non-permitted way, and so forth. The data processing node may further create or select a new usage policy pertaining to the generated new data, which policy should be likewise followed, as well as the usage policy of the source data, whenever the new data derived from the source data is accessed and used by subsequent nodes in the distribution path.

Another action 204 illustrates that the data processing node further calculates a new signature based on an identification of the new data and at least one of: the usage policy of the source data and the new usage policy pertaining to the generated new data and covering the usage policy of the source data. For example, if no new usage policy is created or selected, the new signature can be calculated based on the identification of the new data and on the usage policy of the source data. Alternatively, if a new usage policy is defined which also covers the usage policy of the source data by having rules that correspond to, i.e. dictate or prescribe, the rules in the usage policy of the source data, the new signature can be calculated based on the identification of the new data and on the new usage policy of the new data. The new usage policy may comprise a reference to the usage policy of the source data. Anyway, the new signature will be tied to the new data and also to the usage policy of the source data, either directly or indirectly, according to the above.

In a final shown action 206, the data processing node provides the new data, the above usage policies including the usage policy of the source data and the new usage policy if any, and the above signatures including the source signature and the new signature, to a subsequent data receiving node in the distribution path. Thereby, the data receiving node is enabled to verify and comply with the provided usage policies based on the respective associated signatures. In this context, "providing" the above information may e.g. mean that the data processing node sends the information directly to the data receiving node, although it is also possible that the information is sent to a storage, server, cache, cloud computing resource, or the like, from which the data receiving node is able to retrieve and access the information, e.g. after receiving a suitable notification. In practice, this information may be provided to the data receiving node using any of the abovementioned protocols http, RTP, FTP, and CoAP, although the solution is not limited to these examples.

Also, the term "data receiving node" may represent any entity in the data distribution path, e.g. a server or a terminal, which receives and uses the provided data in some way. It should further be noted that the "data receiving node" in this context may be a final node in the distribution path that does not process and distribute the data any further. Alternatively, the data receiving node may be another data processing node that processes the new data to generate further new data and distributes it to one or more further data receiving nodes. It is further possible that the data processing node provides the above information to more than one data receiving node as well.

Several additional and optional embodiments may be used in the above-described process. For example, when receiving the source data, the usage policy of the source data and the associated source signature from the source node, the data processing node is able to verify the received usage policy based on the associated source signature. This can be done by verifying the source signature based on the identification of the source data and the usage policy of the source data according to a known algorithm. If the verification of the source signature succeeds, the authenticity, i.e. origin and integrity, of the usage policy of the source data is verified. This verification of the source signature can, without limitation, be made in different ways e.g. using conventional techniques. For example, a digital signature can be determined using so-called symmetric cryptography based on a shared key or using asymmetric cryptography, which are well known techniques in the art.

In another possible embodiment, the data processing node may provide a pair of the usage policy and associated signature to the data receiving node by providing just a reference to this pair of usage policy and associated signature, rather than the complete explicit usage policy and associated signature wherein the reference can be used by the data receiving node to retrieve the pair of signature and associated usage policy from a usage policy server in which the usage policy and associated signature have been registered. Likewise, more than one such reference to pairs of usage policies and associated signatures may be provided, e.g. one reference referring to the usage policy and signature of the source and another reference referring to usage policy of the new data and the new signature. In that case, the data receiving node is able to first retrieve the new policy and associated signature from the server and verify the new policy and signature, and then retrieve the source data policy and source signature from the server to verify the policy of the source data as well.

Further, the known technique of Digital Rights Management, DRM can be used for providing a usage policy by adding a DRM Rights Object, RO, sometimes referred to as a "license", to the delivered data, where the RO contains a set of rights, effectively forming the usage policy, and an identity of the source data the policy pertains to. Thus in another possible embodiment, the data processing node may embed or include each of the above-described usage policies in an RO of DRM being a useful format for providing such policies. It is an advantage that it is possible to use such this already existing technique and format since the involved nodes can easily be configured to handle such DRM ROs. The source and new usage policies can also be conveniently expressed in XML format files, although the solution is not limited thereto. A dependency indicator may be included in an RO of the new usage policy to indicate that the new usage policy is dependent on the usage policy of the source data. An example of such an RO in XML format is given below:

```
<ex:agreement>
  <ex:asset>
    <ex:context>
      <dd:uid>SensorDataID3</dd:uid>
    </ex:context>
  </ex:asset>
  <ex:depend>
    <dd:roref>PolicyID1</dd:roref>
  </ex:depend>
  <ex:depend>
    <dd:roref>PolicyID2</dd:roref>
  </ex:depend>
  <ex:permission>
    <dd:read>
      <ex:constraint>
        <dd:datetime>
          <dd:start>2012-01-01T00:00:00Z</dd:start>
          <dd:end>2012-02-01T00:00:00Z</dd:end>
        </dd:datetime>
      </ex:constraint>
    </dd:read>
    <dd:process>
      <ex:constraint>
        <dd:count>3</dd:count>
      </ex:constraint>
      <ex:constraint>
        <dd:notcompatible>SensorDataIDx</dd:notcompatible>
      </ex:constraint>
    </dd:process>
  </ex:permission>
</ex:agreement>
```

The above example of an RO of the new usage policy indicates that the new data, identified by "sensor data ID3", has been generated based on source data from two source nodes, and usage policies "PolicyID1" and "PolicyID2" which are thus usage policies pertaining to the source data originated by the respective two source nodes. In this example of RO, a dependency indicator in the form of an element denoted <dependent> indicates that the new usage policy is dependent on the usage policies "PolicyID1" and "PolicyID2", as highlighted by arrows 1 and 2 in the above RO. As mentioned above when describing action 204 in FIG. 2, the new usage policy may comprise a reference to the usage policy of the source data which thus could be marked by the above dependency indicator. Further, the above exemplified RO contains rules dictating that the SensorDataID3 can be accessed between 2012-01-01 and 2012-02-01, as indicated by elements denoted <permission> and <constraint>. It can also be processed maximum 3 times, but not together with data identified by "SensorDataIDx" at any time, as indicated by the <constraint> element and an element denoted <notcompatible>.

In general, a usage policy may include various information about the data such as an identification of the data source and a timestamp for when the data was generated. Further, a policy may also include one or more rules pertaining to, e.g., allowed and/or blocked user or user groups, start and expiration times for allowed and/or blocked access, allowed and/or blocked processing methods, a maximum number of times the data is allowed to be processed, information on different data that cannot be processed together, etc. However, the solution is not limited to these examples of a policy.

As mentioned above, the term "source node" may refer to one or several source nodes and should therefore be understood as at least one source node in this context. In further possible embodiments, when source data is received from multiple source nodes together with respective usage policies and associated signatures, the data processing node may further check that the received usage policies are mutually consistent and non-conflicting such that two or more of the received usage policies do not contain rules that contradict one another, before the new data is generated.

For example, a usage policy of source data received from a first source node may dictate that this data should not be used after a specific date since the data is considered to be outdated then, while another usage policy of source data received from a second source node may dictate that its data is not allowed to be used before that date e.g. due to privacy considerations. Another example is when one policy dictates that data related to a particular entity or user is not allowed to be published, which policy can be overridden when this data is "concealed" among data of a minimum number of other users, e.g. when some statistic metric is calculated from the data.

Thus, conflicting and contradictory rules may occur in different received usage policies. In some cases, the data processing node is not able to use source data from different source nodes due to conflicting rules and must therefore desist from the processing. Alternatively, it may be decided that one or more of the conflicting rules can be disregarded in the received usage policies. In that case, the data processing node may send the disregarded rule(s) to a usage policy server for registration. Thereby, the provider of the original source data is able to find out if any rules have been disregarded by any subsequent nodes having received and possibly processed the source data or other data generated therefrom.

It is also possible to disregard a rule in one usage policy which rule is inferred or implied by a rule in another usage policy when new data and a new usage policy is dependent on these two usage policies. If any such inferred rule occurs in a received usage policy, it may be decided that the inferred rule can be disregarded in the received usage policies and in that case, the data processing node may likewise send the disregarded rule to the usage policy server for registration, as in the above case with conflicting rules.

When a new usage policy is created which is dependent on one or more usage policies received from one or more preceding nodes and containing a conflicting or inferred rule, a disregard indicator may be included in the RO of the new usage policy to indicate that the conflicting or inferred rule in the usage policies of the source data can be disregarded.

In a possible example in practice, a usage policy P1 coming from a source node S1 has a policy rule y while another usage policy P2 coming from a source node S2 has a policy rule x, such that rule y implies rule x. For example, the rule y could dictate that "data can be accessed only by user A or C", and x could dictate that "data can be accessed only by user A or B or C". In that case, x could be disregarded in a new usage policy P3 dependent on P1 and P2, because it is implied already by y in P1 and the combined policy will "depend" on P1 while rule x can be disregarded.

To support such cases where a previous policy or part of it can be disregarded, the DRM RO can be further extended by introducing the above disregard indicator, e.g. as a new element <ignore> which may be used to specify under which conditions the rule can be disregarded. This element <ignore> can be used on different levels e.g. under any of the abovementioned elements <permission>, <constraint> and <depend>, to allow "fine-grained" control of usage policies.

Figure 3:
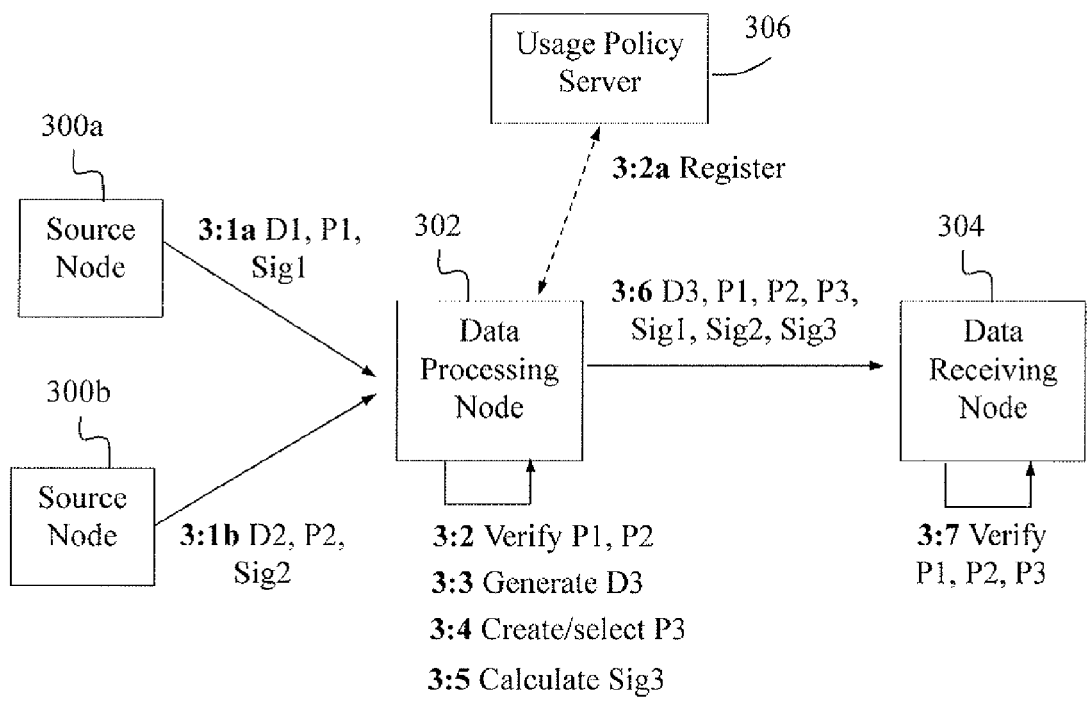
FIG. 3 is a block diagram illustrating distribution and processing of data, according to further possible embodiments.
Figure 4:
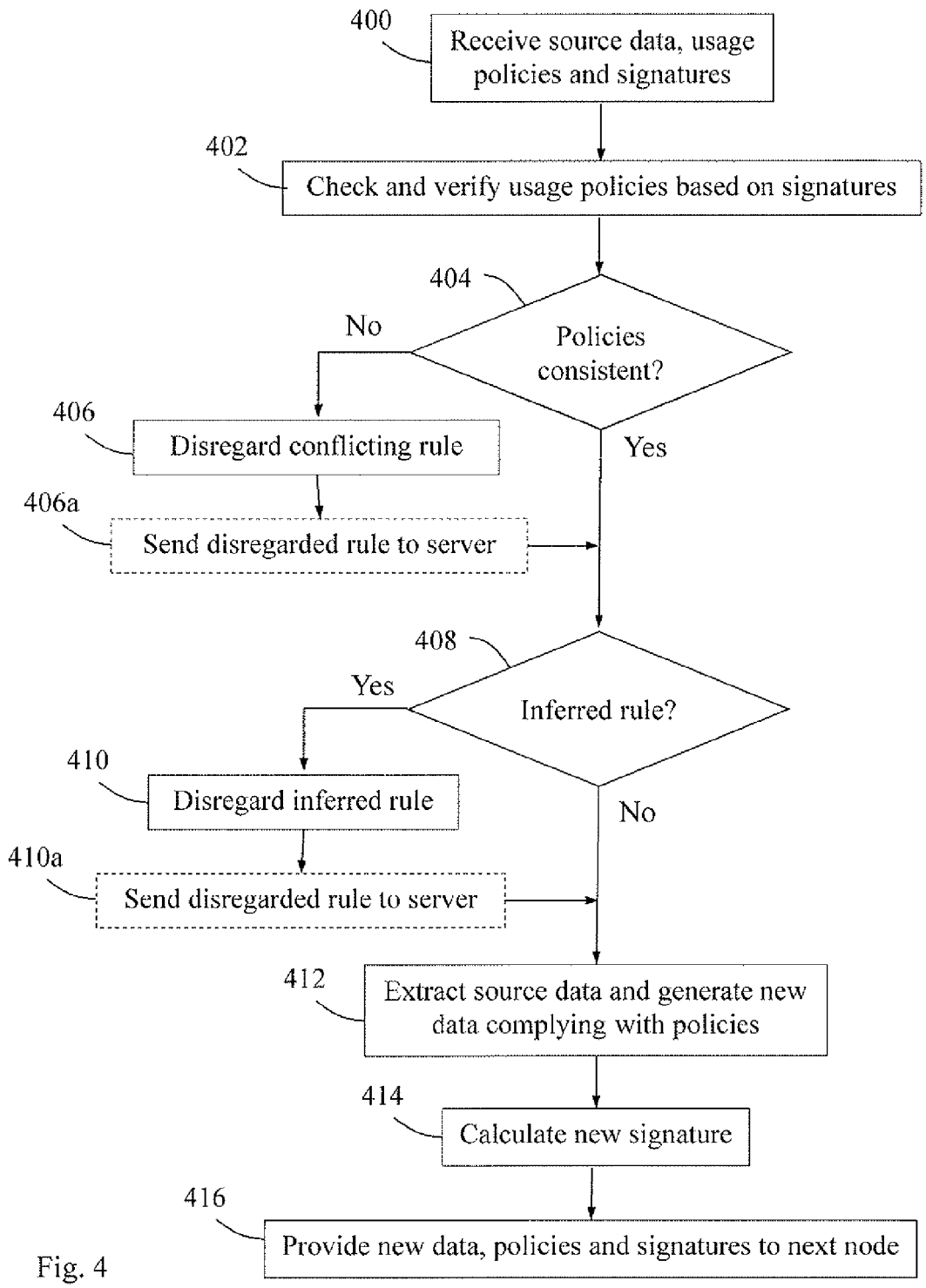
FIG. 4 is a flow chart illustrating a more detailed example of a procedure in a data processing node, according to further possible embodiments.

An example of how multiple ROs can depend on each other in a data distribution network will be described later on with reference to FIG. 4. Before that, an example of how data may be distributed and processed in various nodes in a data distribution network will be described with reference to FIG. 3. This simplified example involves two source nodes 300a, 300b, a data processing node 302 and a data receiving node 304 forming a distribution path originating from the source nodes and propagating through the data processing node 302 and the data receiving node 304, as shown by arrows. However, it should be understood that the actions in this procedure can be applied and used in a more complex data distribution network involving a greater number of nodes and data propagation steps.

In this example, source data is generated and delivered from the source nodes 300a and 300b to the data processing node 302. An action 3:1a thus illustrates that the source node 300a provides its source data "D1" together with a usage policy "P1" pertaining to the source data D1 and an associated source signature "Sig1" that has been calculated based on an identification "Id_D1" of the source data D1 and on the usage policy P1. Likewise, an action 3:1b illustrates that the source node 300b provides its source data "D2" together with a usage policy "P2" pertaining to D2 and an associated source signature "Sig2" calculated based on an identification "Id_D2" of the source data D2 and on the usage policy P2.

The data processing node 302 is now able to perform the following actions. In action 3:2, the received usage policies P1 and P2 are verified, if desired, by verifying the source signatures Sig1 and Sig2, and if the signature verification succeeds, authenticity of the usage policies P1 and P2 can be verified. In this action, the data processing node 302 may discover that a rule in one of the usage policies P1 or P2 can be disregarded, e.g. if the rule conflicts with a rule in the other usage policy P2 or P1, or if the rule is inferred by a rule in the other usage policy P2 or P1, as described in more detail above. In either case, the data processing node 302 may send the disregarded rules to a usage policy server 306 for registration, as shown by an optional action 3:2a. The term "server" should be understood broadly in this context and may comprise one or multiple nodes, or may involve cloud computing and storing, as a resource capable of holding information about usage policies.

In another action 3:3, the data processing node 302 generates new data "D3" based on the received source data D1 and D2, while complying with the usage policies P1 and P2. A further action 3:4 illustrates that the data processing node 302 creates or selects a new usage policy "P3" pertaining to the new data D3. For example, the data processing node 302 may select a default or predefined usage policy to use as the new usage policy P3. In another action 3:5, the data processing node 302 calculates a new signature "Sig3" associated with the new data D3, based on an identification "Id_D3" of the new data and at least one of: the new usage policy P3 of the new data and the usage policies P1, P2 of the source data.

The data processing node 302 then sends the new data D3 along with the usage policies P1, P2, P3 and the signatures Sig1, Sig2, Sig3 to the data receiving node 304, in another action 3:6. Thereby, the data receiving node 304 is enabled to verify and comply with the provided usage policies P1, P2, P3 based on the respective associated signatures Sig1, Sig2, Sig3, which is shown by a last action 3:7.

A more detailed possible example of a procedure in a data processing node will now be described with reference to the flow chart in FIG. 4. In this example, it is assumed that the data processing node receives source data from multiple source nodes. A first action 400 illustrates that the data processing node receives the source data and usage policies of the source data together with associated source signatures from the source nodes. The source signatures have been calculated by the source nodes based on respective identifications of the source data and the respective usage policies of the source data. This action corresponds to action 200 in FIG. 2 described above.

A next action 402 illustrates that the data processing node checks if the received usage policies can be verified and trusted based on the received source signatures, by verifying the signatures in the above-described manner. As explained above, if the signature verification succeeds, authenticity of the usage policies of the source data can be verified. The data processing node further checks if the usage policies are consistent, in an action 404, i.e. if the policies contain any mutually conflicting and contradictory rule. If a conflicting rule exists and it is decided to disregard that rule, the identified conflicting rule is disregarded in an action 406, and the disregarded rule may optionally be sent to a usage policy server in another action 406a. If the received usage policies are found to be consistent in action 404, actions 406 and 406a can naturally be omitted. There may be various reasons for deciding to disregard a conflicting rule, which as such are outside the scope of this solution. In a possible example, it may be acceptable that one of two conflicting rules can be disregarded based on where the respective policies of the two rules come from, i.e. from which nodes in the data distribution network. Another example may be that a restricting rule always overrides a permitting rule and the latter rule can therefore be disregarded.

The process can now continue in an action 408 where the data processing node also checks if the usage policies contain any inferred rule, i.e. if a rule in one of the policies is implied and can be concluded by a rule in another one of the policies. In that case, the identified inferred rule is disregarded in an action 410, and the inferred rule may optionally be sent to the above usage policy server in another action 410a. If no inferred rule is found in the received usage policies in action 408, actions 410 and 410a can naturally be omitted.

In a following action 412, the data processing node extracts the source data and generates new data therefrom, while complying with the received usage policies. In a further action 414, the data processing node calculates a new signature in the manner described for action 204 above, and provides the new data along with the above usage policies and signatures to a next node in the distribution path, in a final shown action 416, basically corresponding to action 206 above. The "next node" may be another data processing node which will further process the new data, or a data receiving node not performing any further processing or distribution of the new data.

Figure 5:
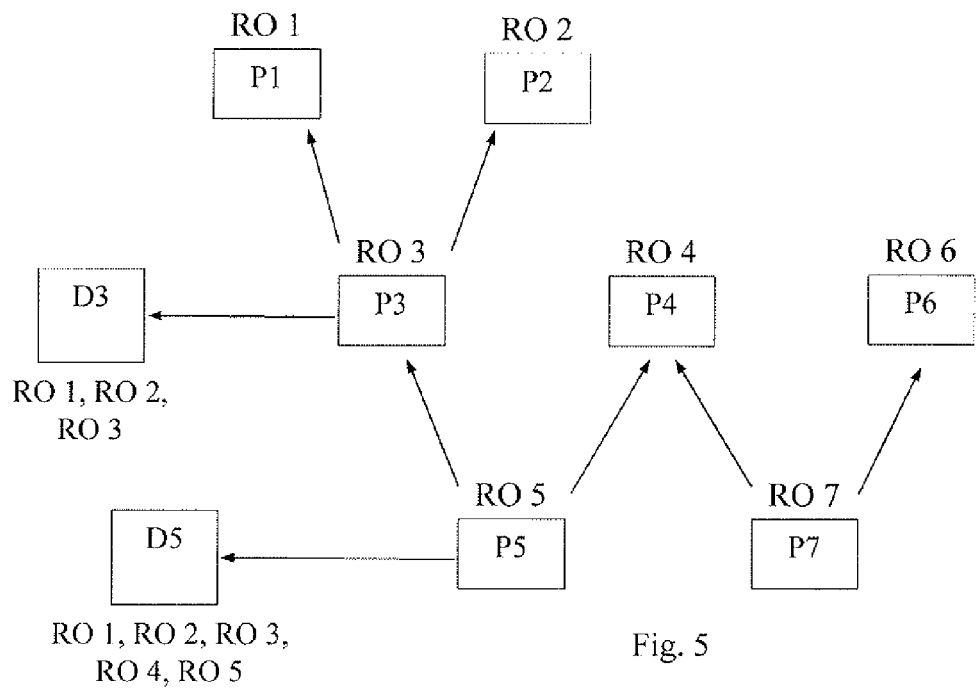
FIG. 5 is a schematic diagram illustrating how DRM rights objects can be used, according to further possible embodiments.

FIG. 5 illustrates how the above-described DRM ROs can be used for handling usage policies in a data distribution network, and how they may depend on each other. In this example, P1 and P2 denote usage policies of source data delivered from two source nodes. These policies are provided in two ROs denoted RO1 and RO2, respectively, from the source nodes. A new usage policy P3 is defined at a data processing node such that P3 is dependent on P1 and P2, since P3 pertains to new data generated based on the source data from both source nodes. Therefore, P3 in another RO3 is likewise dependent on P1 in RO1 and P2 in RO2, as shown by arrows. Usage of the new data "D3" is thus regulated by the policies P1, P2, P3 provided in RO1, RO2, RO3, respectively.

Further, another new usage policy P5 provided in RO5 pertains to new data "D5" generated based on data regulated by P3 in RO3 and data regulated by a policy P4 in RO4. Therefore, P5 in RO5 is dependent on P3 in RO3 and P4 in RO4, as shown by arrows, while P3 in RO3 is dependent on P1 in RO1 and P2 in RO2, as mentioned above. As a result, usage of the new data D5 is thus regulated by the policies P1, P2, P3, P4 provided in RO1, RO2, RO3, RO4, respectively.

Figure 6:
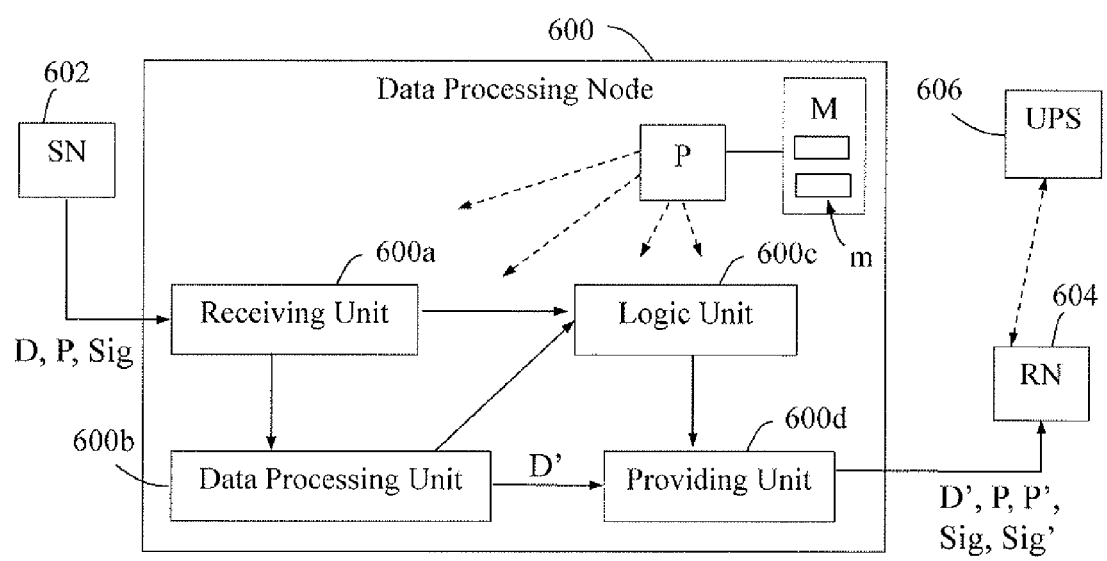
FIG. 6 is a block diagram illustrating a data processing node in more detail, according to further possible embodiments.

A detailed but non-limiting example of how a data processing node may be configured to accomplish the above-described embodiments, is illustrated by the block diagram in FIG. 6. The data processing node 600 is configured to handle a usage policy pertaining to source data generated by a source node 602, e.g. according to the procedures and features described above for any of FIGS. 2-5, respectively. The usage policy dictates permission to access and use the source data. The data processing node 600 will now be described in terms of a possible example of employing the solution.

The data processing node 600 comprises a receiving unit 600a adapted to receive the source data D and usage policy P together with an associated source signature Sig from the source node 602, wherein the source signature has been calculated based on an identification of the source data and the usage policy of the source data. The data processing node 600 also comprises a data processing unit 600b adapted to generate new data D' based on the received source data, complying with the usage policy.

The data processing node 600 further comprises a logic unit 600c adapted to calculate a new signature Sig' based on an identification of the new data and at least a new usage policy P' pertaining to the generated new data. The data processing node 600 also comprises a providing unit 600d adapted to provide the new data D' and the usage policies P, P' and signatures Sig, Sig' to a data receiving node 604, thereby enabling the data receiving node to verify and comply with the provided usage policies based on respective associated signatures.

The data processing node 600 and its functional units 600a-d may be configured or adapted to operate according to various optional embodiments. In a possible embodiment, the logic unit 600c may be further adapted to verify the received usage policy P of the source data based on the associated source signature Sig. In another possible embodiment, the providing unit may also be adapted to provide at least one pair of the usage policies P, P' and associated signatures Sig, Sig' to the data receiving node 604 by providing a reference to each pair of signature and associated usage policy. For example, a first reference may refer to the pair (P, Sig) originating from the source node 602, while a second reference may refer to the pair (P', Sig') originating from the data processing node 600. Such a reference can be used by the data receiving node 604 to retrieve the corresponding pair of signature and associated usage policy from a usage policy server 606.

As in some of the preceding examples, the source node may comprise multiple source nodes. In another possible embodiment, the receiving unit may in that case be further adapted to receive the source data from the multiple source nodes together with respective usage policies and associated signatures. Further, the logic unit may then be adapted to check that the received usage policies are mutually consistent and non-conflicting such that two or more of the received usage policies do not contain rules that contradict one another, before the new data is generated. The logic unit may be further adapted to disregard any conflicting or inferred rules in the received usage policies and to send the disregarded rules to a usage policy server for registration.

In another possible embodiment, the logic unit may be further adapted to verify the source signature Sig by means of an algorithm known by the data processing node and the data receiving node, and to calculate the new signature Sig' using that algorithm. In yet another possible embodiment, the providing unit may be further adapted to embed each of the usage policies P, P' in a Rights Object, RO, of Digital Rights Management, DRM, and to include a dependency indicator in the RO of the new usage policy P' to indicate that the new usage policy is dependent on the usage policy P of the source data. Examples of such a dependency indicator have been shown above.

It was mentioned above that a rule in one usage policy may be inferred or implied by a rule in another usage policy. If such a conflicting or inferred rule is found in two usage policies of the source data, the providing unit may be further adapted to include a disregard indicator in the RO of the new usage policy to indicate that the conflicting or inferred rule can be disregarded.

Figure 7:
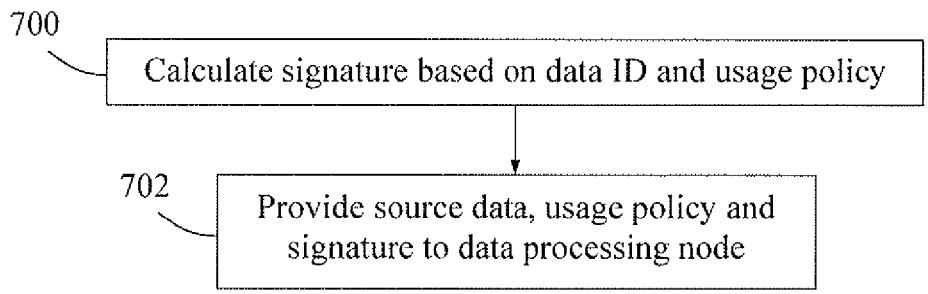
FIG. 7 is a flow chart illustrating a procedure in a source node, according to further possible embodiments.

An exemplary procedure executed in a source node of a data distribution network, for handling a usage policy pertaining to source data generated by the source node, will now be described with reference to the flow chart in FIG. 7. The usage policy of the source data dictates permission to access and use the source data, which policy should thus be followed whenever the source data and data derived therefrom is accessed and used.

A first action 700 illustrates that the source node calculates a signature based on an identification of the source data and the usage policy of the source data. Another action 702 illustrates that the source node provides the source data and the usage policy of the source data and the calculated signature to a data processing node, thereby enabling the data processing node to verify and comply with the usage policy of the source data based on the signature. This action of providing may be performed using any of the above-mentioned protocols http, RTP, FTP, and CoAP, although the solution is not limited thereto.

Figure 8:
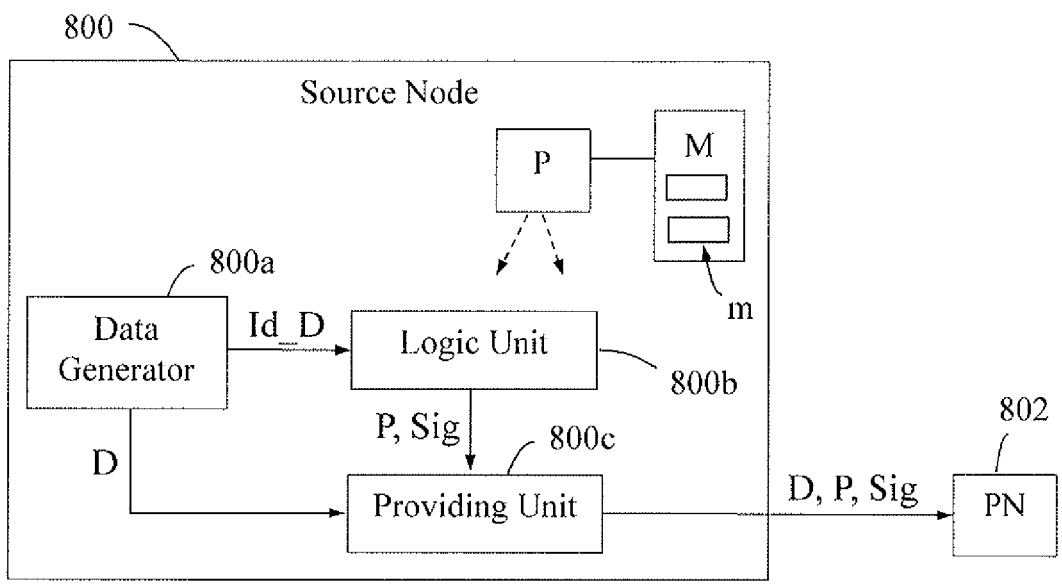
FIG. 8 is a block diagram illustrating a source node in more detail, according to further possible embodiments.

An example of how a source node may be configured to accomplish the above-described embodiments, is illustrated by the block diagram in FIG. 8. The source node 800 is configured to handle a usage policy pertaining to source data generated by the source node, e.g. according to the procedures and features described above for any of FIGS. 2-7, respectively. The usage policy dictates permission to access and use the source data. The source node 800 will now be described in terms of a possible example of employing the solution.

The source node 800 comprises a data generator 800a which operates in a more or less conventional manner to generate data, e.g. by measuring, counting or detecting various parameters depending on the general function of the source node, which as such lies outside the scope of this solution. The source node 800 also comprises a logic unit 800b adapted to calculate a signature Sig based on an identification Id_D of the source data and the usage policy P of the source data. The source node 800 also comprises a providing unit 800c adapted to provide the source data D and the usage policy P of the source data and the calculated signature Sig to a data processing node 802, which is shown as an example of a subsequent node in the distribution path. Thereby, the data processing node is enabled to verify and comply with the usage policy of the source data based on the signature e.g. by using functionality as described above for the data processing node 600 in FIG. 6. Furthermore, any subsequent data processing or receiving nodes in the distribution path are enabled to verify and comply with the usage policy of the source data in the manner described above.

It should be noted that FIG. 6 and FIG. 8 illustrate various functional units in the data processing node 600 and in the source node 800, and the skilled person is able to implement these functional units in practice using suitable software and hardware. Thus, the solution is generally not limited to the shown structures of the data processing node 600 and source node 800, and the functional units 600a-d, 800a-c may be configured to operate according to the features described in this disclosure, where appropriate.

Figure 9:
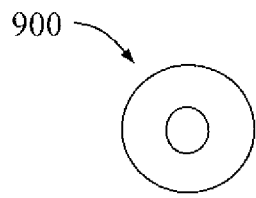
FIG. 9 illustrates a computer program product that may be used to implement embodiments described herein.

The above-described embodiments may be implemented in a computer program comprising computer readable code which, when run on a data processing node, causes the data processing node to behave as a data processing node. Further, the above-described embodiments may be implemented in a computer program product comprising a computer readable medium, and a computer program. The computer program product may be a compact disc 900, as shown in FIG. 9, or other entity suitable for holding the computer program. The computer program may also be downloadable e.g. from a server or the like. The computer program comprises computer readable code which, when run on a data processing node, causes the data processing node to behave as a data processing node such as the node 302 in FIG. 3 and/or the node 600 in FIG. 6. The computer program is stored on the computer readable medium. Some examples of how the computer program and computer program product can be realized in practice are provided below.

The functional units 600a-d and 800a-c described above can be implemented in the data processing node 600 and the source node 800, respectively, by means of program modules of a respective computer program comprising code means which, when run by a processor "P" in each node 600, 800 causes the data processing node 600 and the source node 800 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in the data processing node 600 and the source node 800, respectively, in the form of a memory "M" having a computer readable medium and being connected to the processor P. Each computer program product or memory M thus comprises a computer readable medium on which the computer program is stored e.g. in the form of computer program modules "m". For example, the memory M in either node 600, 800 may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the data processing node 600 and the source node 800.

While the solution has been described with reference to specific examples of embodiments, the description is generally only intended to illustrate the inventive concept and should not be taken as limiting the scope of the solution. For example, the terms "source data", "data processing node", "source node", "usage policy" and "signature" have been used throughout this description, although any other corresponding entities, functions, and/or parameters could also be used having the features and characteristics described here. The solution is defined by the appended claims.

The invention claimed is:

1. A method performed by a data processing node for handling a usage policy pertaining to source data generated by at least one source node, the usage policy dictating permission to access and use the source data, the method comprising:

receiving the source data and usage policy together with an associated source signature from the at least one source node, wherein the source signature has been calculated based on an identification of the source data and the usage policy of the source data, generating new data based on the received source data while complying with the usage policy of the source data, calculating a new signature based on an identification of the new data and at least one of: the usage policy of the source data, and a new usage policy pertaining to the generated new data and covering the usage policy of the source data, and providing the new data and the usage policies and signatures to a data receiving node, thereby enabling the data receiving node to verify and comply with the provided usage policies based on respective associated signatures, wherein at least one of the receiving, generating, calculating, and providing steps are implemented by a processing device of the data processing node.

2. A method according to claim 1, wherein the received usage policy of the source data is verified based on the associated source signature.

3. A method according to claim 1, wherein at least one pair of the usage policies and associated signatures is provided to the data receiving node by providing a reference to the pair of usage policy and associated signature, wherein the reference can be used for retrieving the pair of signature and associated usage policy from a usage policy server.

4. A method according to any of claim 1, wherein the at least one source node comprises multiple source nodes and the source data is received from the multiple source nodes together with respective usage policies and associated signatures, the method further comprising checking that the received usage policies are mutually consistent and non-conflicting such that two or more of the received usage policies do not contain rules that contradict one another, before the new data is generated.

5. A method according to claim 4, further comprising disregarding any conflicting or inferred rules in the received usage policies and sending the disregarded rules to a usage policy server for registration.

6. A method according to any of claim 1, wherein the source signature is verified by means of an algorithm known by the data processing node and the data receiving node.

7. A method according to claim 1, wherein each of the usage policies is embedded in a Rights Object, RO, of Digital Rights Management, DRM, and wherein a dependency indicator is included in the RO of the new usage policy to indicate that the new usage policy is dependent on the usage policy of the source data.

8. A method according to claim 5, wherein a disregard indicator is included in the RO of the new usage policy to indicate that a conflicting or inferred rule in the usage policies of the source data can be disregarded.

9. A method according to claim 1, wherein the source and new usage policies are expressed in XML format files.

10. A method according to claim 1, wherein said receiving and providing are performed using any of: hypertext transfer protocol http, Real Time Protocol RTP, File Transfer Protocol FTP, and Constrained Application Protocol CoAP.

11. A data processing node configured to handle a usage policy pertaining to source data generated by at least one source node, the usage policy dictating permission to access and use the source data, the data processing node comprising:

a processing device;

a receiving unit adapted to receive the source data and usage policy together with an associated source signature from the source node, wherein the source signature has been calculated based on an identification of the source data and the usage policy of the source data, a data processing unit adapted to generate new data based on the received source data, while complying with the usage policy of the source data, a logic unit adapted to calculate a new signature based on an identification of the new data and at least one of: a new usage policy pertaining to the generated new data and the usage policy of the source data, and a providing unit adapted to provide the new data and the usage policies and signatures to a data receiving node, thereby enabling the data receiving node to verify and comply with the provided usage policies based on respective associated signatures, wherein at least one of the receiving unit, the data processing unit, the logic unit, and the providing unit are implemented by the processing device.

12. A data processing node according to claim 11, wherein the logic unit is further adapted to verify the received usage policy of the source data based on the associated source signature.

13. A data processing node according to claim 11, wherein the providing unit is further adapted to provide at least one pair of the usage policies and associated signatures to the data receiving node by providing a reference to the pair of signature and associated usage policy, wherein the reference can be used for retrieving the pair of signature and associated usage policy from a usage policy server.

14. A data processing node according to claim 11, wherein the at least one source node comprises multiple source nodes and the receiving unit is further adapted to receive the source data from the multiple source nodes together with respective usage policies and associated signatures, and the logic unit is further adapted to check that the received usage policies are mutually consistent and non-conflicting such that two or more of the received usage policies do not contain rules that contradict one another, before the new data is generated.

15. A data processing node according to claim 14, wherein the logic unit is further adapted to disregard any conflicting or inferred rules in the received usage policies and to send the disregarded rules to a usage policy server for registration.

16. A data processing node according to claim 11, wherein the logic unit is further adapted to verify the source signature by means of an algorithm known by the data processing node and the data receiving node, and to calculate the new signature using the algorithm.

17. A data processing node according to claim 11, wherein the providing unit is further adapted to embed each of the usage policies in a Rights Object, RO, of Digital Rights Management, DRM, and to include a dependency indicator in the RO of the new usage policy to indicate that the new usage policy is dependent on the usage policy of the source data.

18. A data processing node according to claim 15, wherein the providing unit is further adapted to include a disregard indicator in the RO of the new usage policy to indicate that a conflicting or inferred rule in the usage policies of the source data can be disregarded.

* * * * *